United States Patent
Liu et al.

(10) Patent No.: US 9,796,596 B2
(45) Date of Patent: *Oct. 24, 2017

(54) METHOD FOR PREPARING ZEOLITE SSZ-52

(71) Applicant: CHEVRON U.S.A. INC, San Ramon, CA (US)

(72) Inventors: Tianxiang Liu, Cambridge, MA (US); Tracy Margaret Davis, Novato, CA (US); Christopher Michael Lew, Richmond, CA (US); Dan Xie, Richmond, CA (US); Saleh Ali Elomari, Fairfield, CA (US); Michael W. Deem, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 168 days.

This patent is subject to a terminal disclaimer.

(21) Appl. No.: 14/836,290

(22) Filed: Aug. 26, 2015

(65) Prior Publication Data

US 2016/0068402 A1    Mar. 10, 2016

Related U.S. Application Data

(60) Provisional application No. 62/047,775, filed on Sep. 9, 2014.

(51) Int. Cl.
| | | |
|---|---|---|
| *C01B 39/48* | (2006.01) | |
| *C01B 39/06* | (2006.01) | |

(52) U.S. Cl.
CPC .............. *C01B 39/48* (2013.01); *C01B 39/06* (2013.01)

(58) Field of Classification Search
None
See application file for complete search history.

(56) References Cited

U.S. PATENT DOCUMENTS

| | | |
|---|---|---|
| 6,254,849 B1 | 7/2001 | Lee et al. |
| 6,379,531 B2 | 4/2002 | Lee et al. |
| 6,616,911 B2 | 9/2003 | Elomari |
| 6,620,401 B1 | 9/2003 | Elomari |

OTHER PUBLICATIONS

International Search Report, International Application No. PCT/US2015/031471, dated Sep. 14, 2015.
D. Xie, L.B. McCusker, C. Baerlocher, S.I. Zones, W. Wan and X. Zou "SSZ-52, a Zeolite with an 18-Layer Aluminosilicate Framework Structure Related to That of the DeNOx Catalyst Cu-SSZ-13" J. Am. Chem. Soc. 2013, 135, 10519-10524.
A. Burton and S. Elomari "SSZ-60: a new large-pore zeolite related to ZSM-23" Chem. Commun. 2004, 2618-2619.

*Primary Examiner* — Yun Qian
(74) *Attorney, Agent, or Firm* — Terrence M. Flaherty

(57) ABSTRACT

A method is disclosed for synthesizing zeolite SSZ-52 in the presence of an organic structure directing agent having the following structure (1):

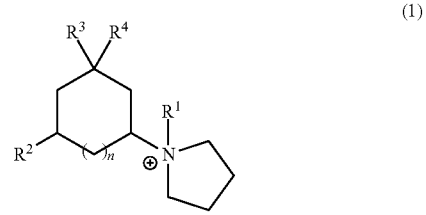

wherein $R^1$, $R^2$, $R^3$ and $R^4$ are independently selected from the group consisting of alkyl groups having from 1 to 3 carbon atoms and n has a value of 0, 1 or 2.

6 Claims, 4 Drawing Sheets

METHOD FOR PREPARING ZEOLITE SSZ-52

CROSS-REFERENCE TO RELATED APPLICATIONS

This application claims the priority benefit of U.S. Provisional Application No. 62/047,775, filed Sep. 9, 2014, which is incorporated herein by reference.

TECHNICAL FIELD

This disclosure is generally directed to methods for preparing zeolite SSZ-52.

BACKGROUND

Molecular sieves such as zeolites have been used extensively to catalyze a number of chemical reactions in refinery and petrochemical reactions, and catalysis, adsorption, separation, and chromatography. For example, with respect to zeolites, both synthetic and natural zeolites and their use in promoting certain reactions, including conversion of methanol to olefins (MTO reactions) and the selective catalytic reduction (SCR) of nitrogen oxides with a reductant such as ammonia, urea or a hydrocarbon in the presence of oxygen, are well known in the art. Zeolites are crystalline materials having rather uniform pore sizes which, depending upon the type of zeolite and the type and amount of cations included in the zeolite lattice, range from about 3 to 10 Å (0.3 to 1 nm) in diameter.

Zeolites having 8-ring pore openings and double-six ring secondary building units, particularly those having cage-like structures have recently found interest in use as SCR catalysts. A specific type of zeolite having these properties is the zeolite SSZ-52 which has been assigned the framework type SFW by Structure Commission of the International Zeolite Association. SSZ-52 has a three-dimensional 8-ring channel system and is a member of the ABC-6 family of zeolites (stacking sequence AABBAABBCCBBCCAACC), but it has cavities that are significantly larger than any known ABC-6 family member.

U.S. Pat. No. 6,254,849 discloses zeolite SSZ-52 and its synthesis in the presence of an N,N-diethyl-5,8-dimethyl-azonium bicyclo[3.2.2.]nonane cation as a structure directing agent.

The commercial development of SSZ-52 has been hindered by the high cost of the organic structure directing agent required in U.S. Pat. No. 6,254,849 for its synthesis and hence there has been significant interest in finding alternative, less expensive structure directing agents for the synthesis of SSZ-52.

Accordingly, it has now been found that additional relatively simple cations described herein can be effective as structure directing agents in the synthesis of SSZ-52.

SUMMARY

In one aspect, there is provided a process for preparing zeolite SSZ-52 by: (a) preparing a reaction mixture containing (1) at least one source of silicon; (2) one or more sources of one or more oxides selected from the group consisting of oxides of trivalent elements, pentavalent elements, and mixtures thereof; (3) at least one source of an element selected from Groups 1 and 2 of the Periodic Table; (4) at least one organic structure directing agent represented by structure (1) below; (5) optionally, an auxiliary structure directing agent comprising an N-cyclohexylmethyl-N-ethylpiperidinium cation; (6) hydroxide ions; and (7) water; and (b) subjecting the reaction mixture to crystallization conditions sufficient to form crystals of the zeolite.

In yet another aspect, there is provided zeolite SSZ-52 having a composition, as-synthesized and in the anhydrous state, in terms of mole ratios, as follows:

| | |
|---|---|
| $SiO_2/X_2O_b$ | 6 to 50 |
| $(Q + A)/SiO_2$ | 0.02 to 0.08 |
| $M/SiO_2$ | 0.03 to 0.20 | wherein (1) X is selected from the group consisting of trivalent and pentavalent elements from Groups 3-13 of the Periodic Table, and mixtures thereof; (2) stoichiometric variable b equals the valence state of compositional variable X (e.g., when X is trivalent, b=3; when X is pentavalent, b=5); (3) Q is at least one organic structure directing agent represented by structure (1) below, and Q>0; (4) A is an auxiliary structure directing agent comprising an N-cyclohexylmethyl-N-ethylpiperidinium cation, and A≥0; and (5) M is selected from the group consisting of elements from Groups 1 and 2 of the Periodic Table.

DETAILED DESCRIPTION

Introduction

Figure 1:
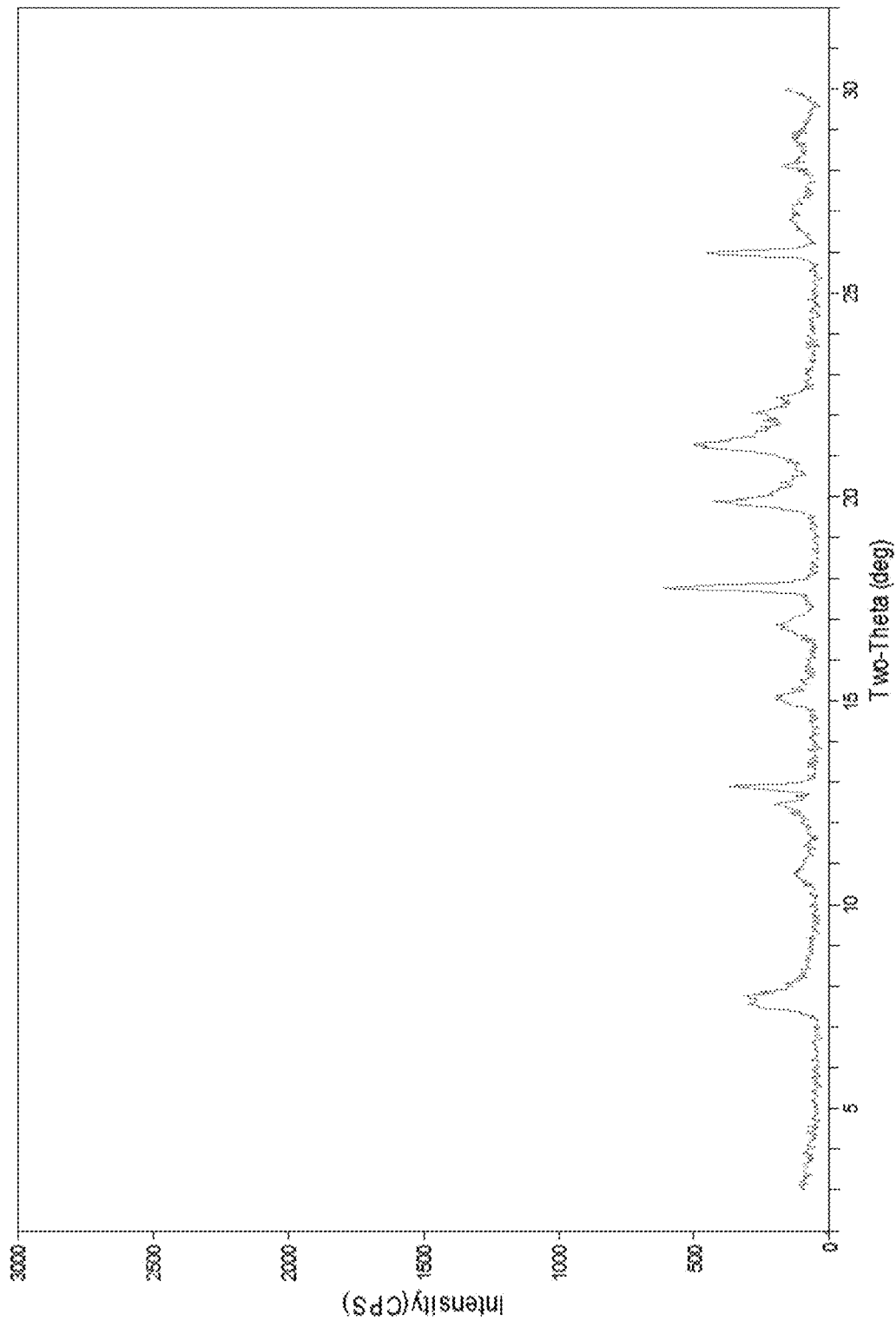
FIG. 1 shows the powder X-ray diffraction (XRD) pattern of the as-synthesized zeolite product of Example 1.

The term "alkyl" refers to a straight chain or a branched chain saturated hydrocarbon group. Some examples of straight chain and branched chain saturated hydrocarbon groups are methyl, ethyl, propyl, isopropyl, and the like.

As used herein, the numbering scheme for the Periodic Table Groups is as disclosed in Chem. Eng. News, 63(5), 27 (1985).

The synthesis of zeolite SSZ-52 is conducted in the presence of at least one organic structure directing agent ("OSDA") having the structure (1):

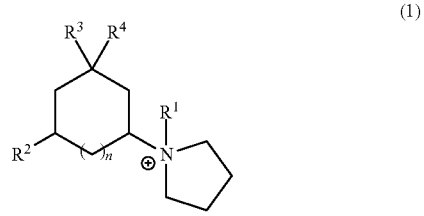

wherein $R^1$, $R^2$, $R^3$ and $R^4$ are independently selected from the group consisting of alkyl groups having from 1 to 3 carbon atoms and n has a value of 0, 1 or 2.

Exemplary cationic organic structure directing agents include N-methyl-N-(2,4,4-trimethylcyclopentyl)pyrrolidinium, N-ethyl-N-(2,4,4-trimethylcyclopentyl)pyrrolidinium, N-propyl-N-(2,4,4-trimethylcyclopentyl)pyrrolidinium, N-isopropyl-N-(2,4,4-trimethylcyclopentyl)pyrrolidinium, N-methyl-N-(3,3,5-trimethylcyclohexyl)pyrrolidinium, N-ethyl-N-(3,3,5-trimethylcyclohexyl)pyrrolidinium, N-propyl-N-(3,3,5-trimethylcyclohexyl)pyrrolidinium, N-isopropyl-N-(3,3,5-trimethylcyclohexyl)pyrrolidinium, N-methyl-N-(3,3,5-trimethylcycloheptyl)pyrrolidinium, N-ethyl-N-(3,3,5-trimethylcycloheptyl)pyrrolidinium, N-propyl-N-(3,3,5-trimethylcycloheptyl)pyrrolidinium, N-isopropyl-N-(3,3,5-trimethylcycloheptyl)pyrrolidinium, and the like, and mixtures thereof.

In one embodiment, the organic structure directing agent is selected from the group consisting of an N-ethyl-N-(2,4,4-trimethylcyclopentyl)pyrrolidinium cation, an N-ethyl-N-(3,3,5-trimethylcyclohexyl)pyrrolidinium cation, and mixtures thereof. The N-ethyl-N-(2,4,4-trimethylcyclopentyl)pyrrolidinium cation and the N-ethyl-N-(3,3,5-trimethylcyclohexyl)pyrrolidinium cation are represented by the following structures (2) and (3), respectively:

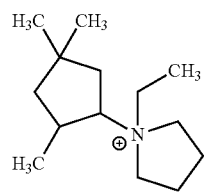

(2)

N-ethyl-N-(2,4,4-trimethylcyclopentyl)pyrrolidinium cation

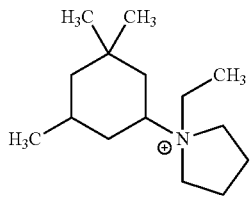

(3)

N-ethyl-N-(3,3,5-trimethylcyclohexyl)pyrrolidinium cation

U.S. Pat. Nos. 6,616,911 and 6,620,401 disclose the synthesis of zeolite SSZ-60 in the presence of an N-ethyl-N-(2,4,4-trimethylcyclopentyl)pyrrolidinium cation or an N-ethyl-N-(3,3,5-trimethylcyclohexyl)pyrrolidinium cation. SSZ-60 possesses a one-dimensional channel system with pores delimited by twelve-membered rings. SSZ-60 has been assigned the framework type SSY by Structure Commission of the International Zeolite Association.

The OSDA cation is associated with anions which can be any anion that is not detrimental to the formation of SSZ-52. Representative anions include elements from Group 17 of the Periodic Table (e.g., fluoride, chloride, bromide, and iodide), hydroxide, sulfate, tetrafluoroborate, acetate, carboxylate, and the like.

Reaction Mixture

In general, zeolite SSZ-52 is prepared by: (a) preparing a reaction mixture containing (1) at least one source of silicon; (2) one or more sources of one or more oxides selected from the group consisting of oxides of trivalent elements, pentavalent elements, and mixtures thereof; (3) at least one source of an element selected from Groups 1 and 2 of the Periodic Table; (4) at least one organic structure directing agent represented by structure (1) herein; (5) optionally, an auxiliary structure directing agent comprising an N-cyclohexylmethyl-N-ethylpiperidinium cation; (6) hydroxide ions; and (7) water; and (b) subjecting the reaction mixture to crystallization conditions sufficient to form crystals of the zeolite.

The composition of the reaction mixture from which SSZ-52 is formed, in terms of mole ratios, is identified in Table 1 below:

TABLE 1

| | |
|---|---|
| $SiO_2/X_2O_b$ | 15 to 60 |
| $OH/SiO_2$ | 0.30 to 1.0 |
| $(Q + A)/SiO_2$ | 0.10 to 0.40 |
| $M/SiO_2$ | 0.10 to 0.50 |
| $H_2O/SiO_2$ | 15 to 50 | wherein compositional variables X, Q, A, M and stoichiometric variable b are as described herein above.

When the auxiliary structure directing agent (A) is present, the Q/A mole ratio of the reaction mixture can range from 1:1 to 10:1 (e.g., from 1:1 to 5:1, from 2:1 to 10:1, or from 2:1 to 5:1).

Sources useful herein for silicon include fumed silica, precipitated silicates, silica hydrogel, silicic acid, colloidal silica, tetra-alkyl orthosilicates (e.g., tetraethyl orthosilicate), and silica hydroxides.

For each embodiment described herein, X is selected from the group consisting of trivalent and pentavalent elements from Groups 3-13 of the Periodic Table. In one sub-embodiment, X is selected from the group consisting of boron (B), aluminum (Al), gallium (Ga), indium (In), iron (Fe), and mixtures thereof. In another sub-embodiment, X is selected from the group consisting of boron, aluminum, gallium, indium, and mixtures thereof. In yet another sub-embodiment, X is aluminum. Sources of elements for compositional variable X include oxides, hydroxides, acetates, oxalates, ammonium salts and sulfates of the element(s) selected for X. Typical sources of aluminum oxide include aluminates, alumina, and aluminum compounds such as $AlCl_3$, $Al_2(SO_4)_3$, $Al(OH)_3$, kaolin clays, and other zeolites. An example of the source of aluminum oxide is zeolite Y.

In one embodiment, Q is selected from the group consisting of an N-ethyl-N-(2,4,4-trimethylcyclopentyl)pyrrolidinium cation, an N-ethyl-N-(3,3,5-trimethylcyclohexyl)pyrrolidinium cation, and mixtures thereof.

As described herein above, the reaction mixture can be formed using at least one source of an element selected from Groups 1 and 2 of the Periodic Table (referred to herein as M). In one sub-embodiment, the reaction mixture is formed using a source of an element from Group 1 of the Periodic Table. In another sub-embodiment, the reaction mixture is formed using a source of sodium (Na). Any M-containing compound which is not detrimental to the crystallization process is suitable. Sources for such Groups 1 and 2 elements include oxides, hydroxides, halides, nitrates, sulfates, acetates, oxalates, and citrates thereof.

For each embodiment described herein, the zeolite reaction mixture can be supplied by more than one source. Also, two or more reaction components can be provided by one source.

The reaction mixture can be prepared either batch wise or continuously. Crystal size, morphology and crystallization time of the zeolite described herein can vary with the nature of the reaction mixture and the synthesis conditions.

Crystallization and Post-Synthesis Treatment

In practice, zeolite SSZ-52 is prepared by: (a) preparing a reaction mixture as described herein above; and (b) subjecting the reaction mixture to crystallization conditions sufficient to form crystals of the zeolite (see, e.g., H. Robson, "Verified Syntheses of Zeolitic Materials," Second Revised Edition, Elsevier, 2001).

The reaction mixture is maintained at an elevated temperature until the zeolite is formed. The hydrothermal crystallization is usually conducted under pressure, and usually in an autoclave so that the reaction mixture is subject to autogenous pressure, at a temperature of from 125° C. to 200° C.

The reaction mixture can be subjected to mild stirring or agitation during the crystallization step. It will be understood by a skilled artisan that the zeolites described herein may contain impurities, such as amorphous materials, unit cells having framework topologies which do not coincide with the zeolite, and/or other impurities (e.g., organic hydrocarbons).

During the hydrothermal crystallization step, the zeolite crystals can be allowed to nucleate spontaneously from the reaction mixture. The use of crystals of the zeolite as seed material can be advantageous in decreasing the time necessary for complete crystallization to occur. In addition, seeding can lead to an increased purity of the product obtained by promoting the nucleation and/or formation of the zeolite over any undesired phases. When used as seeds, seed crystals are added in an amount of from 1% to 10% of the weight of the source for silicon used in the reaction mixture.

Once the zeolite has formed, the solid product is separated from the reaction mixture by standard mechanical separation techniques such as filtration. The crystals are water-washed and then dried to obtain the as-synthesized zeolite crystals. The drying step can be performed at atmospheric pressure or under vacuum.

The zeolite can be used as-synthesized, but typically will be thermally treated (calcined). The term "as-synthesized" refers to the zeolite in its form after crystallization, prior to removal of the OSDA cation. The OSDA can be removed by thermal treatment (e.g., calcination), preferably in an oxidative atmosphere (e.g., air, gas with an oxygen partial pressure of greater than 0 kPa) at a temperature readily determinable by a skilled artisan sufficient to remove the OSDA from the zeolite. The OSDA can also be removed by photolysis techniques (e.g., exposing the OSDA-containing zeolite product to light or electromagnetic radiation that has a wavelength shorter than visible light under conditions sufficient to selectively remove the organic compound from the zeolite) as described in U.S. Pat. No. 6,960,327.

The zeolite can subsequently be calcined in steam, air or inert gas at temperatures ranging from 200° C. to 800° C. for periods of time ranging from 1 to 48 hours, or more. Usually, it is desirable to remove the extra-framework cation (e.g., $Na^+$) by ion-exchange or other known method and replace it with hydrogen, ammonium, or any desired metal-ion.

Characterization of the Zeolite

SSZ-52 made by the process disclosed herein have a composition, as-synthesized and in the anhydrous state, as described in Table 2 (in terms of mole ratios):

TABLE 2

| | |
|---|---|
| $SiO_2/X_2O_b$ | 6 to 50 |
| (Q + A)/$SiO_2$ | 0.02 to 0.08 |
| M/$SiO_2$ | 0.03 to 0.20 | wherein compositional variables X, Q, A, M and stoichiometric variable b are as described herein above.

In one embodiment, Q is selected from the group consisting of an N-ethyl-N-(2,4,4-trimethylcyclopentyl)pyrrolidinium cation, an N-ethyl-N-(3,3,5-trimethylcyclohexyl)pyrrolidinium cation, and mixtures thereof.

The SSZ-52 zeolites synthesized by the process described herein are characterized by their X-ray diffraction pattern. XRD patterns representative of SSZ-52 can be referenced in U.S. Pat. No. 6,254,849. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the X-ray diffraction pattern. Notwithstanding these minor pertubations, the basic crystal structure remains unchanged.

The powder X-ray diffraction patterns presented herein were collected by standard techniques. The radiation was $CuK_\alpha$ radiation. The peak heights and the positions, as a function of 2θ where θ is the Bragg angle, were read from the relative intensities of the peaks and d, the interplanar spacing corresponding to the recorded lines, can be calculated.

EXAMPLES

The following illustrative examples are intended to be non-limiting.

Example 1

A Teflon liner was charged with 2.7 g of an aqueous solution of N-ethyl-N-(3,3,5-trimethylcyclohexyl)pyrrolidinium hydroxide (0.625 mmol OH/g solution) followed by 1.30 g of a 1N NaOH solution. 2.46 g of a sodium silicate solution was then added dropwise to the mixture followed by 0.42 g of a commercial ammonium-exchanged Y zeolite (CBV300, Zeolyst International, $SiO_2/Al_2O_3$ mole ratio=5.1, 25% water). The final composition of the reaction mixture, in terms of mole ratios, was as follows:

| | |
|---|---|
| Si/Al | 10.6 |
| Q/Si | 0.11 |
| Na/Si | 0.54 |
| $H_2O$/Si | 18 |

The liner was then capped and placed within a Parr steel autoclave reactor. The autoclave was then fixed in a rotating spit (43 rpm) within an oven and heated at 135° C. for seven days. The solid products were recovered from the cooled reactor by vacuum filtration and washed with deionized water. The solids were allowed to dry overnight at room temperature.

Figure 2:
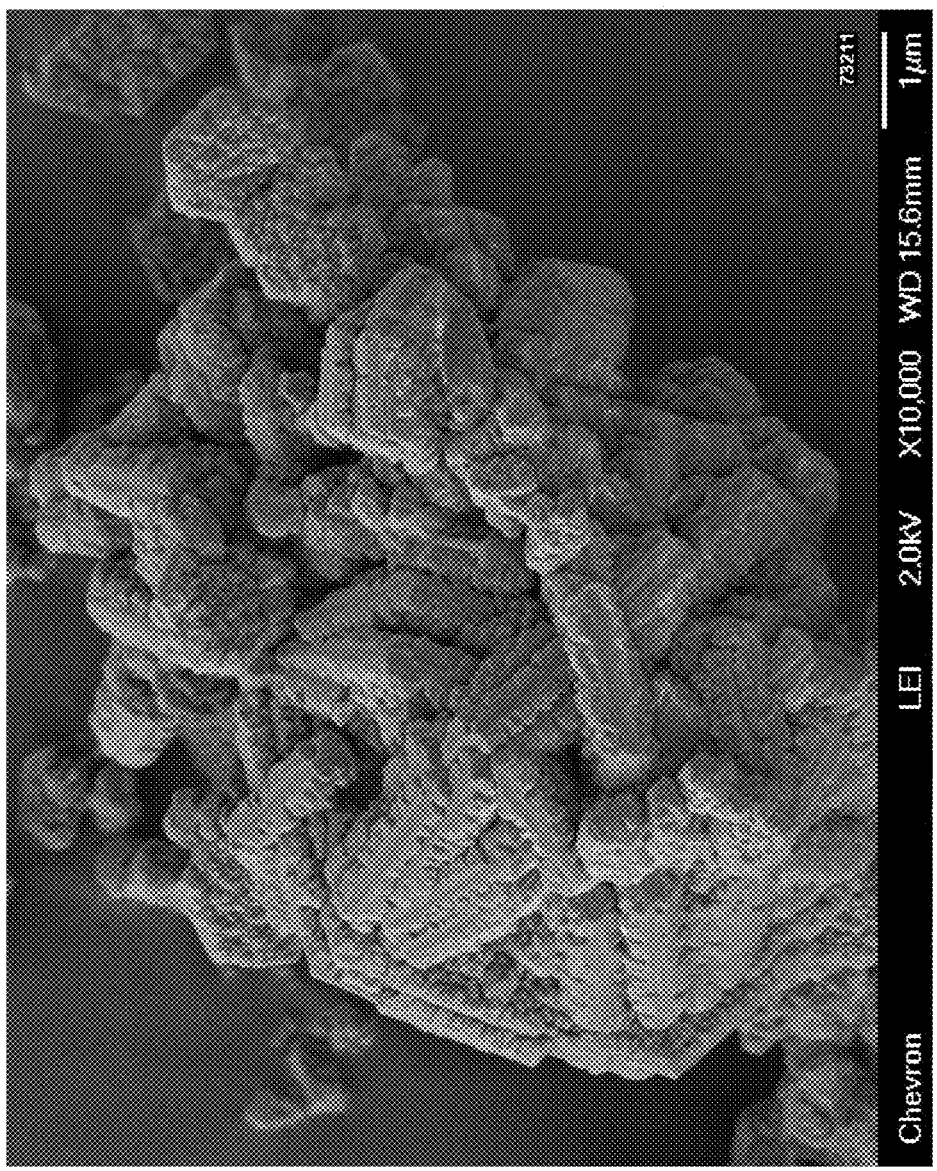
FIG. 2 shows a Scanning Electron Micrograph (SEM) of the as-synthesized zeolite product of Example 1.

The resulting product was analyzed by powder XRD and SEM. The powder XRD pattern is shown in FIG. 1 and indicated that the material was SSZ-52. The SEM image shown in FIG. 2 indicates a uniform field of crystals.

Example 2

A Teflon liner was charged with 4.12 g of an aqueous solution of N-ethyl-N-(2,4,4-trimethylcyclopentyl)pyrrolidinium hydroxide (0.364 mmol OH/g solution) followed by 1.30 g of a 1N NaOH solution. 2.46 g of a sodium silicate solution was then added dropwise to the mixture followed by 0.42 g of a commercial ammonium-exchanged Y zeolite (CBV300, Zeolyst International, SiO$_2$/Al$_2$O$_3$ mole ratio=5.1, 25% water). Finally, 2.14 g of deionized water was added to the Teflon liner. The final composition of the reaction mixture, in terms of mole ratios, was as follows:

| | |
|---|---|
| Si/Al | 10.6 |
| Q/Si | 0.095 |
| Na/Si | 0.54 |
| H$_2$O/Si | 30.9 |

The liner was then capped and placed within a Parr steel autoclave reactor. The autoclave was then fixed in a rotating spit (43 rpm) within an oven and heated at 135° C. for seven days. The solid products were recovered from the cooled reactor by vacuum filtration and washed with deionized water. The solids were allowed to dry overnight at room temperature.

Figure 3:
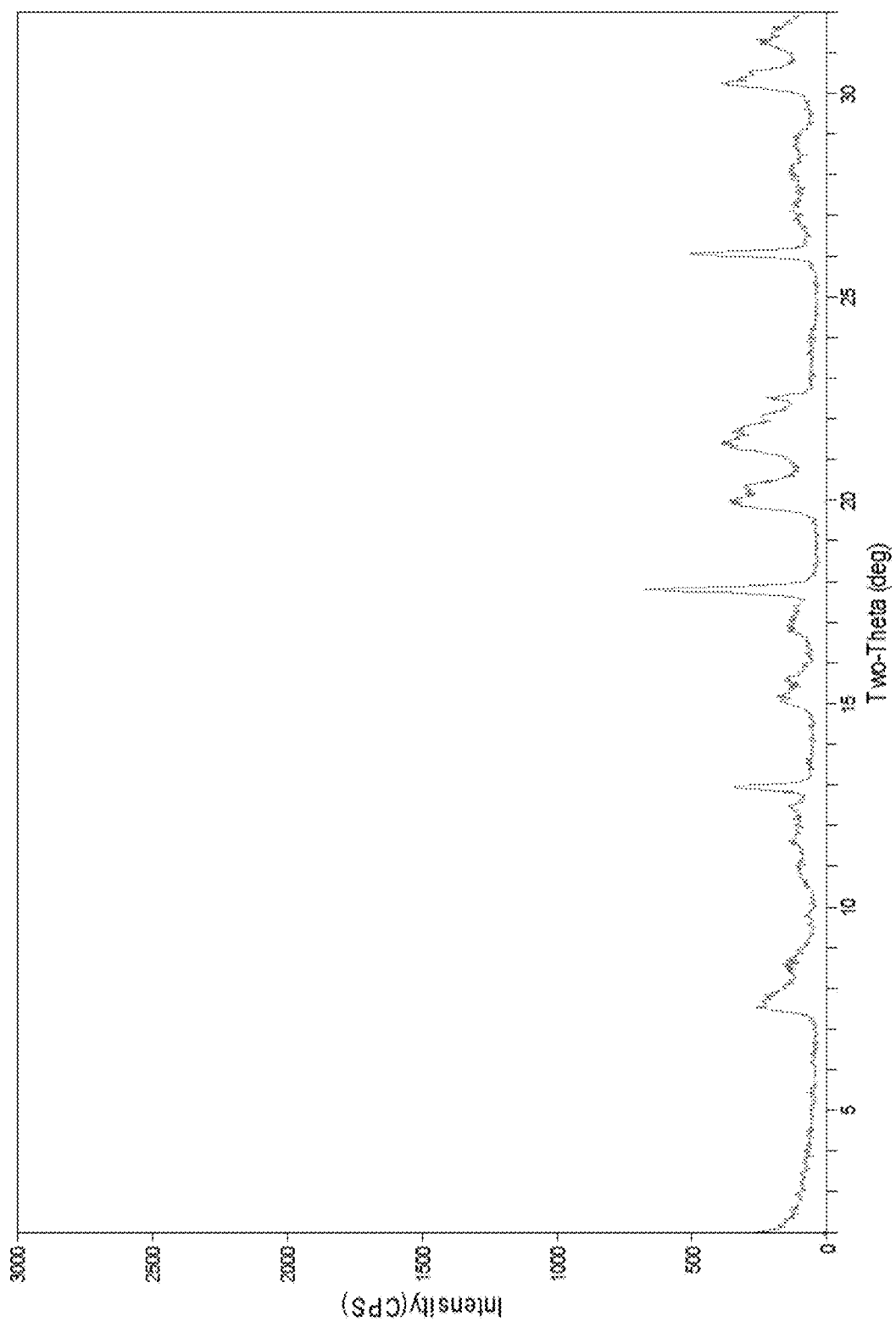
FIG. 3 shows the powder XRD pattern of the as-synthesized zeolite product of Example 2.

The resulting product was analyzed by powder XRD. The powder XRD pattern is shown in FIG. 3 and indicated that the material was SSZ-52.

Example 3

Synthesis of Auxiliary Structure Directing Agent N-Cyclohexylmethyl-N-ethylpiperidinium Cation A 1000 mL 3-necked round bottom flask fitted with an overhead stirrer was charged with 24.29 g of triethylamine (TEA), 17.42 g of piperidine and 400 mL of toluene. The mixture was cooled in an ice bath. A dropping funnel was charged with a solution of 29.55 g of cyclohexanecarbonyl chloride in 100 mL of toluene. The cyclohexanecarbonyl chloride solution was then added dropwise to the mixture in the round bottom flask and the mixture was allowed to stir overnight. The reaction mixture was then concentrated under vacuum to remove most of the toluene. Water (113 g) was added to the residual white solid followed by ethyl acetate (200 mL). The organic layer was collected and concentrated under vacuum to provide cyclohexyl-piperidin-1-yl-methanone.

An addition funnel was charged with a solution of 38.82 g of cyclohexyl-piperidin-1-yl-methanone in 200 mL of methylene chloride. A 2 L 3-necked round bottom flask was charged with 350 mL of methylene chloride and 10.17 g of lithium aluminum hydride (LiAlH$_4$). The mixture in the round bottom flask was cooled in an ice bath and kept under a nitrogen atmosphere. The cyclohexyl-piperidin-1-yl-methanone solution was added dropwise to the round bottom flask over two hours. After an additional 30 minutes, the ice bath was removed and the reaction mixture was allowed to warm up to room temperature and allowed to stir overnight. The resulting suspension was then cooled in an ice bath. Water (12 g) was added slowly to the mixture with vigorous stirring followed by 12 g of a 15% aqueous NaOH solution. An additional 50 mL of methylene chloride was added to the mixture to replace some of the evaporated solvent. An additional 40 g of water was added slowly to the mixture. The mixture was then allowed to warm up to room temperature. The solids were filtered and washed two times with methylene chloride to remove any entrained product. The filtrate was collected, dried with sodium sulfate, and concentrated under vacuum to provide 34.15 g of N-cyclohexylmethylpiperidine.

N-Cyclohexylmethylpiperidine (34.15 g) was dissolved in 300 mL of methanol. An addition funnel was charged with a solution of 62 g of ethyl iodide in 100 mL of methanol. The ethyl iodide solution was added dropwise to the N-cyclohexylmethylpiperidine solution and then refluxed for 48 hours. The mixture was then concentrated under vacuum to remove most of the ethyl iodide and methanol. N-cyclohexylmethyl-N-ethylpiperidinium iodide (49.9 g) was recrystallized from hot acetone and diethyl ether.

The obtained N-cyclohexylmethyl-N-ethylpiperidinium iodide was dissolved in deionized water (1 mL H$_2$O/1 mmol salt) and then 1.1 g of hydroxide-based ion exchange resin/1 mmol salt was added. The resulting slurry was left to stir gently for a few hours. The slurry was filtered and the filtrate was analyzed by titration of a small aliquot with dilute HCl. The exchange afforded N-cyclohexylmethyl-N-ethylpiperidinium hydroxide in nearly quantitative yield.

Scheme 1 below depicts the synthesis of the N-cyclohexylmethyl-N-ethylpiperidinium cation.

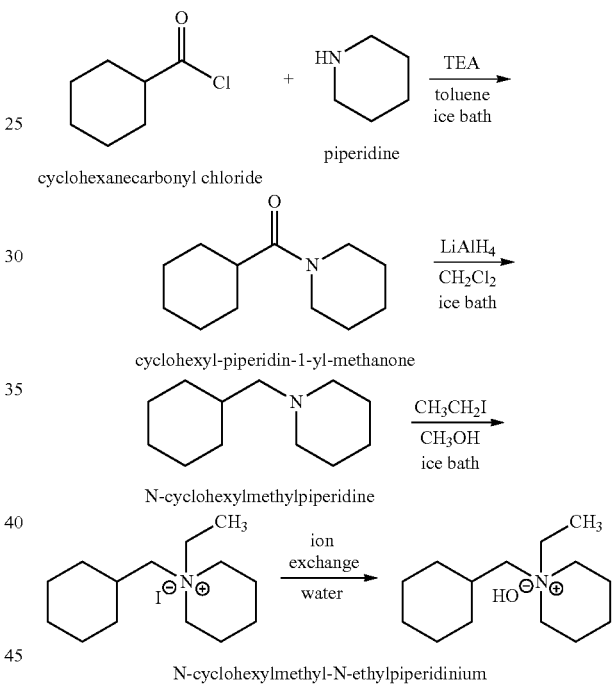

SCHEME 1

Example 4

Example 1 was repeated except that an auxiliary structure directing agent (A), N-cyclohexylmethyl-N-ethylpiperidinium hydroxide, was added to the reaction mixture. The Q/A ratio of the reaction mixture was 4:1. The final composition of the reaction mixture, in terms of mole ratios, was as follows:

| | |
|---|---|
| Si/Al | 10.6 |
| (Q + A)/Si | 0.11 |
| Na/Si | 0.54 |
| H$_2$O/Si | 28.9 |

The resulting product was analyzed by powder XRD. The powder XRD pattern indicated that the material was SSZ-52.

Example 5

NO$_x$ Conversion

Calcined SSZ-52 was loaded with copper by weight via an incipient wetness process. The ion-exchanged material was then activated by increasing the temperature of the material from room temperature to 150° C. at a rate of 2° C./minute, holding the material at 150° C. for 16 hours, then increasing the temperature of the material to 450° C. at a rate of 5° C./minute, holding the material at 450° C. for 16 hours. The material was then allowed to cool to room temperature again.

Figure 4:
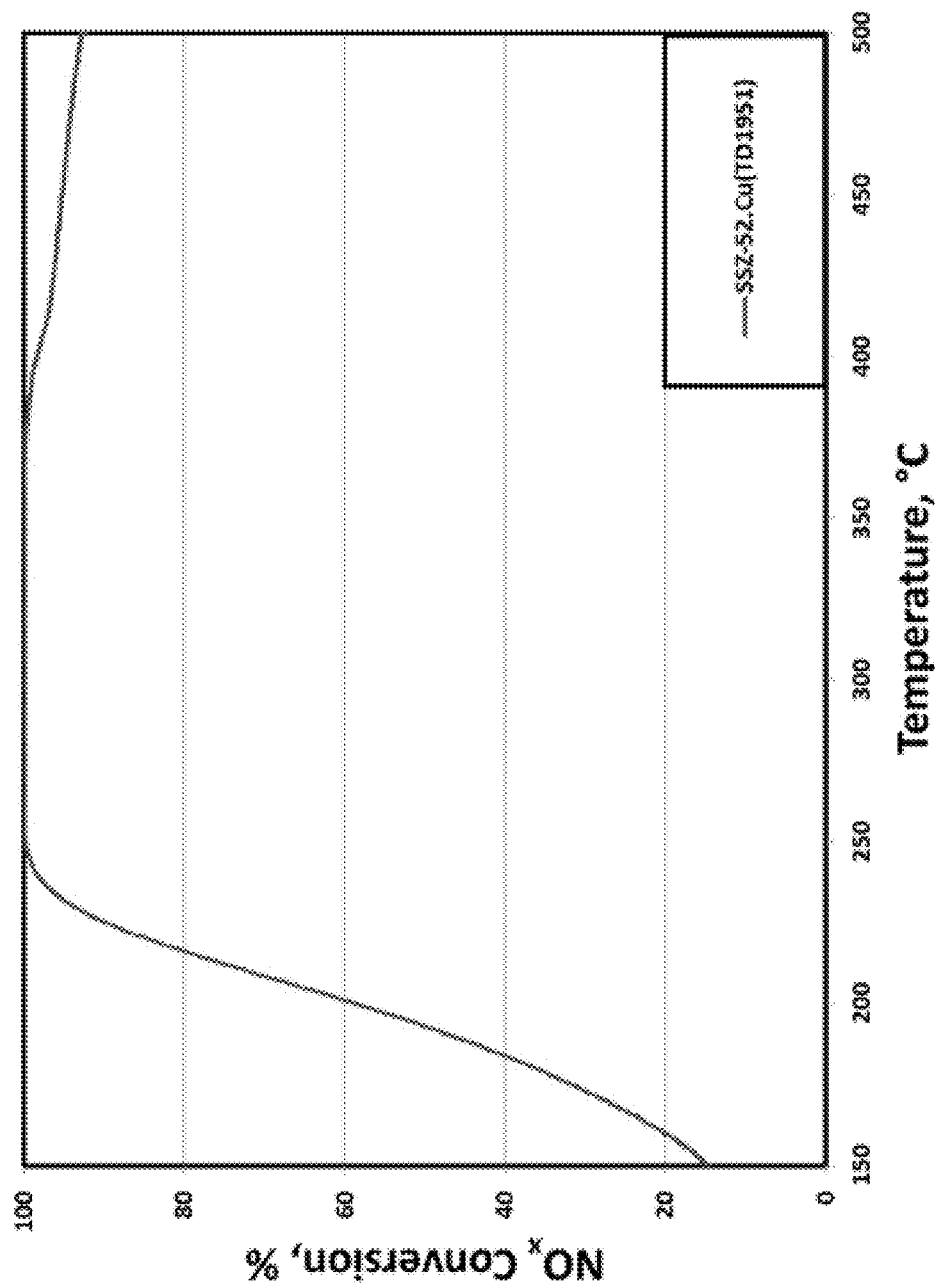
FIG. 4 is a graph illustrating NO conversion based on temperature of Cu/SSZ-52.

The sample was tested to determine its capacity for NO$_x$ conversion (e.g., into N$_2$ and O$_2$) as a function of temperature. Fresh (i.e., un-aged) Cu/SSZ-52 was tested using a Synthetic Catalyst Activity Test (SCAT) rig under the following conditions: 500 ppm NO, 500 ppm NH$_3$, 10% O$_2$, 10% H$_2$O and the balance N$_2$; and a space velocity of 60,000/hour. The results are shown in FIG. 4.

For the purposes of this specification and appended claims, unless otherwise indicated, all numbers expressing quantities, percentages or proportions, and other numerical values used in the specification and claims, are to be understood as being modified in all instances by the term "about." Furthermore, all ranges disclosed herein are inclusive of the endpoints and are independently combinable. Whenever a numerical range with a lower limit and an upper limit are disclosed, any number falling within the range is also specifically disclosed.

As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

Any term, abbreviation or shorthand not defined is understood to have the ordinary meaning used by a skilled artisan at the time the application is filed. The singular forms "a," "an," and "the," include plural references unless expressly and unequivocally limited to one instance.

All of the publications, patents and patent applications cited in this application are herein incorporated by reference in their entirety to the same extent as if the disclosure of each individual publication, patent application or patent was specifically and individually indicated to be incorporated by reference in its entirety.

The invention claimed is:

1. A method for preparing zeolite SSZ-52, comprising:
    (a) preparing a reaction mixture containing:
        (1) at least one source of silicon;
        (2) one or more sources of one or more oxides selected from the group consisting of oxides of trivalent elements, pentavalent elements, and mixtures thereof;
        (3) at least one source of an element selected from Groups 1 and 2 of the Periodic Table;
        (4) at least one organic structure directing agent represented by the following structure:

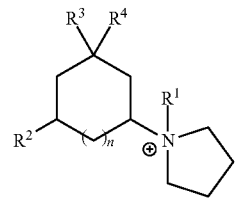

wherein R$^1$, R$^2$, R$^3$ and R$^4$ are independently selected from the group consisting of alkyl groups having from 1 to 3 carbon atoms and n has a value of 0, 1 or 2;
        (5) optionally, an auxiliary structure directing agent comprising an N-cyclohexylmethyl-N-ethylpiperidinium cation;
        (6) hydroxide ions; and
        (7) water; and
    (b) subjecting the reaction mixture to crystallization conditions sufficient to form crystals of the zeolite.

2. The method of claim 1, wherein the organic structure directing agent is selected from the group consisting of an N-ethyl-N-(2,4,4-trimethylcyclopentyl)pyrrolidinium cation, an N-ethyl-N-(3,3,5-trimethylcyclohexyl)pyrrolidinium cation, and mixtures thereof.

3. The method of claim 1, wherein the zeolite is prepared from a reaction mixture comprising, in terms of mole ratios, the following:

| | |
|---|---|
| SiO$_2$/X$_2$O$_b$ | 15 to 60 |
| OH/SiO$_2$ | 0.30 to 1.0 |
| (Q + A)/SiO$_2$ | 0.10 to 0.40 |
| M/SiO$_2$ | 0.10 to 0.50 |
| H$_2$O/SiO$_2$ | 15 to 50 | wherein:
    (1) X is selected from the group consisting of trivalent and pentavalent elements from Groups 3-13 of the Periodic Table, and mixtures thereof;
    (2) stoichiometric variable b equals the valence state of compositional variable X;
    (3) Q is the at least one organic structure directing agent, and Q>0;
    (4) A is an auxiliary structure directing agent comprising an N-cyclohexylmethyl-N-ethylpiperidinium cation, and A≥0; and
    (5) M is selected from the group consisting of elements from Groups 1 and 2 of the Periodic Table.

4. The method of claim 3, wherein Q is selected from the group consisting of an N-ethyl-N-(2,4,4-trimethylcyclopentyl)pyrrolidinium cation, an N-ethyl-N-(3,3,5-trimethylcyclohexyl)pyrrolidinium cation, and mixtures thereof.

5. The method of claim 3, wherein X is selected from the group consisting of B, Al, Ga, In, and mixtures thereof.

6. The method of claim 3, wherein X is Al.

* * * * *